United States Patent [19]
Lafebre

[11] 3,752,521
[45] Aug. 14, 1973

[54] PROTECTIVE VEHICLE TRIM STRIP
[76] Inventor: Adolph Lafebre, 12314 Wicks Ave., Sun Valley, Calif. 91352
[22] Filed: Apr. 1, 1971
[21] Appl. No.: 130,333

[52] U.S. Cl............................ 293/1, 293/62, 52/716
[51] Int. Cl.............................................. B60r 19/08
[58] Field of Search......................... 293/1, 54 D, 62; 52/716, 717, 718

[56] References Cited
UNITED STATES PATENTS

| | | | |
|---|---|---|---|
| 3,290,082 | 12/1966 | Fritsch | 293/1 |
| 1,972,283 | 9/1934 | Zimmers | 280/163 |
| 2,217,574 | 10/1940 | Tinnerman | 52/718 |
| 2,889,165 | 6/1959 | Zientara | 293/1 |
| 3,388,523 | 6/1968 | Evans | 52/717 |
| 3,398,921 | 8/1968 | Braun | 248/345.1 |
| 3,451,709 | 6/1969 | Swauger | 293/1 |
| 3,506,294 | 4/1970 | Newman | 293/1 |

Primary Examiner—Robert G. Sheridan
Assistant Examiner—Robert Saifer
Attorney—Christie, Parker & Hale

[57] ABSTRACT

A vehicle trim and protective molding comprising a partially closed channel strip for receiving and retaining a protruding, resilient strip of material such as weather resistant vinyl. The channel is fastened to the surface to be protected by securing means extending between the base of the channel and the surface. End pieces each having a reduced portion at its interior end are engaged at opposite ends of each channel in a telescoping relationship. The end pieces are provided in various configurations for the front and rear of the strip and are physically secured to the channel by catch and detent arrangements or by riveting. On strips to be mounted on doors, the front end piece is mitered to provide clearance when the door is opened and closed.

28 Claims, 7 Drawing Figures

INVENTOR.
ADOLPH LAFEBRE

BY
Christie, Parker & Hale
ATTORNEYS

PROTECTIVE VEHICLE TRIM STRIP

DESCRIPTION OF THE PRIOR ART

The present invention relates to protective vehicle trim strips and more particularly to molding assemblies installed along the sides of an automobile which incorporate a protruding, compressibly resilient, rubber or plastic bumper strip.

The concept of providing an automobile trim or molding assembly with a bumper portion of a resilient material is a known technique and is illustrated in such U.S. Pat. as Nos. 3,359,030 and 3,388,523. Such assemblies generally comprise an open-ended channel shaped receiving strip having a resilient insert wedged into the channel opening and decorative pieces located at the front and rear ends of the strip.

It has been found that assemblies of the foregoing type are insecure due to the nature and number of end pieces used with the base receiving strip and to the manner in which the resilient strip is anchored at each end of the channel shaped receiving strip. In many typical arrangements the resilient insert is fabricated of a rubber material and is merely cut off at a door line or other point marking the end of each section of the strip. Several separate sections or assemblies comprise the overall bumper strip with one each, for the front and rear fenders and one for each of the doors of the vehicle. End pieces are typically not provided at the rear end of each individual assembly with the usual result that the resilient member slides and creeps in its channel, causing the door to bind on opening and closing and severing or breaking of the resilient member. In addition, end pieces when they have been used, have, in the main, been insubstantial, shell-type, decorative inserts with no specific functional purpose. As such, they are subject to disengagement and loss, necessitating replacement and repair.

Because it is desirable to protect the vehicle throughout its length, the strips are dimensioned so as to extend as close as possible to the door lines without binding. Because of the deep draught of doors upon opening in modern cars, it has been found that either the strip itself has to be spaced a substantial distance away from the door to prevent binding or that the strips have to be mitered in order to avoid the binding problem. Where mitering is necessary, an additional installation step is required and the dimensioning of the resilient insert is made more difficult. In the alternate embodiment, spacing of the end of the strips a substantial distance from the door lines to prevent binding, of necessity, means that portions of the side of the vehicle on either side of the door lines go unprotected.

SUMMARY OF THE PRESENT INVENTION

The present invention provides a vehicle trim and protective strip comprising a receiving channel of a predetermined length which has a base portion securable to the vehicle and a pair of opposed sidewalls with each of the side walls being located along an opposite edge of the base portion. A resilient molding strip is secured in said channel between said side walls and an end piece is located at each end of the channel adjacent an end of the molding strip. The end pieces include a reduced portion slidably engaged in a telescoping relationship with the base portion and said walls of the channel. Securing means for interlocking the base portion of the receiving channel and the base of the reduced portion of the end pieces complete the assembly.

In another aspect, the invention provides a protective bumper strip comprising an elongated molding of a resilient material having a pair of indentations extending longitudinally of the strip on each side thereof. A channel-shaped elongated rigid receiver for the molding is provided with the receiver comprising a web portion having at least one aperture for a through-the-web fastening of the receiver to the surface to be protected and a pair of curved flanges extending from said web upwardly and inwardly toward each other to define a longitudinally extending slot for the molding strip with the free edges of the flanges being engaged in the indentations. A detent is located in the interior surface of said receiver adjacent each end of the receiver and an end piece is slidably engaged in each end of the receiver. Catch means located in the surface of each end piece are engaged with said receiver detents whereby said end pieces are secured in position in said receiver in abutting relationship with said molding.

In still another aspect of the invention, a method of mounting a protective strip on a vehicle is contemplated. The method comprises the steps of engaging end pieces in a D-shaped channel having a portion corresponding to the apex of the D removed. The channel and engaged end piece assembly is then secured to the surface to be protected. Thereafter, a molding strip of a resilient material is cut to length and forced into the slot defined by the channel in the space between the end pieces.

Bumper and protective strips according to the present invention are particularly suited for protecting the side of a vehicle extending essentially over its entire length from headlight to taillight from damage due to opening of the doors of vehicles parked alongside. To accommodate the door openings, the strip is provided in separate sections extending over the front and rear fenders and over each of the doors of the vehicle.

A particularly advantageous aspect of the present invention is that the end pieces are solid castings and are provided at both ends of each individual section of the overall vehicle protective strip. The end pieces are physically locked or secured to the base portion of the vehicle trim strip such that they are solidly anchored in place at the ends of said base portion. In one presently preferred embodiment anchoring is accomplished by punching the bottom of the assembled receiver and end piece creating a detent (punch rivet) extending into the base of the end piece.

In a second embodiment catches are built into the base of the end pieces which are engageable with detents or apertures provided in a mating location in the web portion of the receiver or base strip. Provision of solid end pieces of this type make possible a significantly more secure trim strip which, in one embodiment, permits placement of the resilient molding strip in the receiving channel in a laterally compressed friction-fitted relationship with the sides of the channel and in a longitudinally compressed relationship between the end pieces anchored at each end of the channel. The result is a substantially more secure and solid assembly.

In the catch and detent embodiment, a spike extension is integrally formed with the catch which is incorporated into the end pieces and is brought out beyond the interior end of the end pieces such that it is engageable with the strip of resilient molding material to provide a further means of anchoring the strip in the channel. Such an embodiment has the further advantage of reducing the criticality of selecting the proper length of the resilient strip since in this embodiment the strip can be alternately compressively or tensionally engaged in the channel depending on the actual length to which it is cut.

The invention has the further advantage that it readily lends itself to marketing in kit form for do-it-yourself installation by the vehicle owner. Significant aspects of the capability of being so marketed are the catch and detent arrangement, the noncriticality of cutting the resilient molding strip to the proper length and the ease of securing the receiver strip to the vehicle and the molding strip in the receiver strip. In addition, in the sections of the strip intended for mounting on the door panels of a vehicle, the front end piece of each such section is provided in a mitered configuration such that when the door is open, the door is free to swing on its hinges without fear of the trim strip binding either on the panel or on the protective strip attached to the panel immediately ahead of it.

DESCRIPTION OF THE DRAWING

These and other advantages of the present invention will be better understood by reference to the following figures of the drawing in which.

DESCRIPTION OF A SPECIFIC EMBODIMENT

Figure 1:
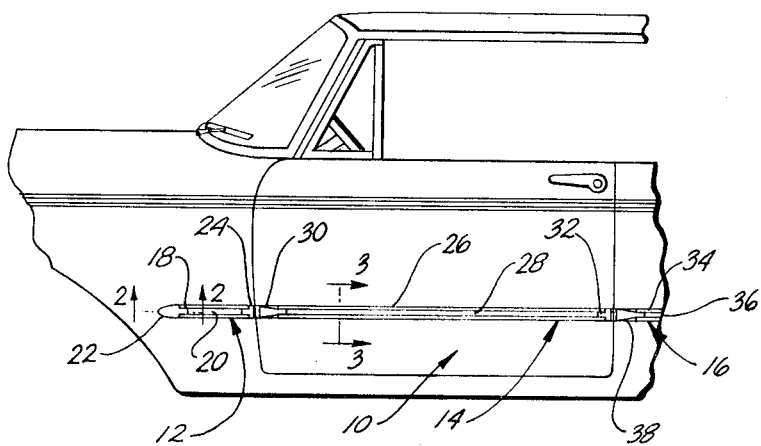
FIG. 1 is a side elevation view of a portion of a vehicle having a trim strip, according to the present invention, attached thereto.

Referring now to FIG. 1, there is shown three sections 12, 14 and 16 of a vehicle trim and protective strip 10 according to the present invention. Section 12 includes a channel-shaped receiving portion or member 18 secured to the side of the front fender portion of the vehicle, a resilient molding strip 20 mounted in portion 18, a front end piece 22 and a rear end piece 24 secured to portion 18 at opposite ends thereof in an abutting relationship with molding strip 20. Section 14 likewise comprises a channel-shaped receiving or base portion 26 mounted on the door of the vehicle, a strip of resilient molding material 28 mounted therein with a mitered end piece 30 secured at the leading end of section 14 and an end piece 32 similar in all respects to end piece 24 secured at the opposite end thereof. Section 16 mounted on the rear fender assembly likewise comprises a channel-shaped receiving or base portion 34 having a resilient molding strip 36 mounted therein. The channel 34 is closed by a mitered front end piece 38 similar to end pieces 24 and 32. The rear end of section 16 (not shown) resembles the corresponding ends of sections 12 and 14. Where the vehicle is provided with four or more doors, a plurality of sections, each similar to section 14, are provided on each door.

Figure 2:
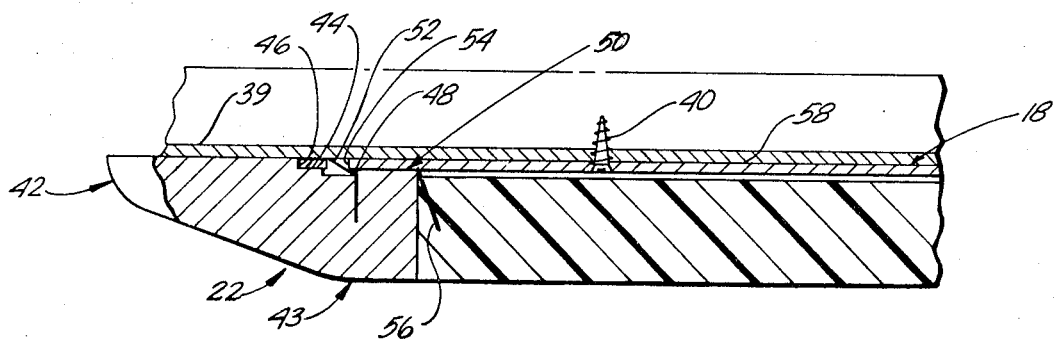
FIG. 2 is a sectional view taken along the lines 2—2 of FIG. 1.

Further details of the decorative and protective trim strip according to the present invention are shown in FIG. 2, a sectional view taken along lines 2—2 of FIG. 1. As shown, the strip is mounted on a surface 39 by securing channel portion 18 with a plurality of tapered head screws of which screw 40 is representative. The number of fasteners required to secure a complete trim strip to the side of the vehicle varies depending on its overall length and the existence of any unusual contours in the side panels. On the average approximately 36 screws or other fasteners are required. As shown, end piece 22, slidably engaged in channel portion 18, is comprised of a front half 42 and a rear half 43 having a reduced portion 44 which is engaged in a telescoping or key and receiving slot relationship on the leading end of channel member 18. A shoulder 46 defines the line of juncture between front half 42 and reduced or telescoping portion 44 in the rear half 43. When mounted in channel 18, reduced portion 44 telescopes into the space defined by the web portion and side walls of the channel such that its interiormost end is situated in an abutting relationship with molding strip 20 and shoulder 46 abuts the end of the channel.

A slot 48 is located in reduced portion 44 for receiving spring a clip 50. Clip 50 comprises a catch portion 52 which is engaged in an aperture 54 in the base or web portion 58 of channel 18 for locking end piece 22 in position in the channel. Clip 50 likewise includes at the end opposite catch 52 a spike 56 which is embedded in molding strip 20 to secure the strip in position in an abutting relationship with end piece 22. Clip 50 provides the means whereby the molding strip 20 may be held in channel 18 under tension, if necessary, in order to leave no unoccupied spaces or gaps along the length of each of the individual sections of the strip. Clip 50 also provides a means whereby the end piece may be easily removed from the channel. Thus, the catch 52 may be compressed to clear the aperture 54 and release the reduced portion which is then easily removable from the channel.

Figure 3:
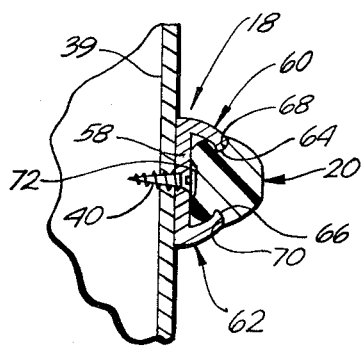
FIG. 3 is a sectional view taken along the lines 3—3 of FIG. 1.

As can be seen from the sectional view in FIG. 3, channel 18 has essentially a D-shaped cross sectional configuration with the belly or apex of the D being removed. The channel is shown secured to surface 39 by means of screw fastener 40. Channel 18, which in the preferred embodiment is an aluminum extrusion but can also be fabricated of other types of semi-rigid materials, has base or web portion 58 with a first side wall or flange 60 curving upwardly and inwardly from one edge of the base portion 58 and a second side wall or flange 62 curving upwardly and inwardly from the opposite edge of the base portion, thereby defining a slot in a partially closed channel. Walls 60 and 62 terminate in a knife edge 64 and 66, respectively, at their free edges. When molding strip 20 is forced into the slot defined by channel 18, longitudinal detents 68 and 70 in the side walls of strip 20, respectively, are engaged by knife edges 64 and 66. The slot and strip are dimensioned such that edges 64 and 66 grip and bite into the longitudinal detents 68, 70 and laterally compress strip 20, securely anchoring it in place. As shown in FIG. 3, a third detent 72 is provided along the base of strip 20 such that the heads of the screw fasteners extending through web portion 58 have an area clearance below strip 20 and do not bear against the underside of strip 20. This eliminates the possibility of unsightly lumps along the molding strip corresponding to the spacing of the screw fasteners.

Figure 4:
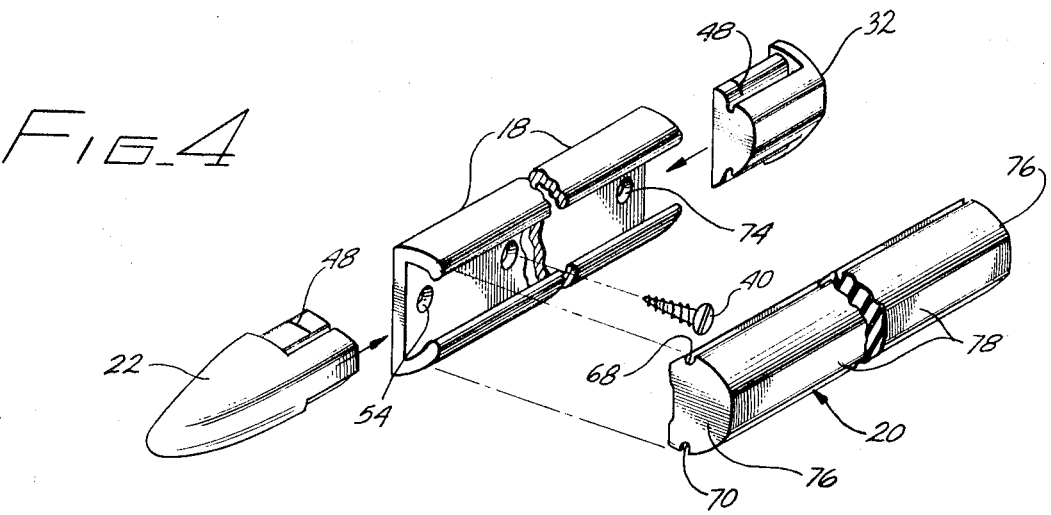
FIG. 4 is an exploded view of the assembly according to the present invention showing the relationship of the channel-shaped receiving portion, the resilient molding strip and the pointed front end piece.

The steps by which the protective strip of the present invention is mounted on a surface to be protected is shown in FIG. 4, an exploded view of the base channel, molding strip, front and rear pieces. In making the assembly two alternatives are possible at the outset. Base channel 18 can be mounted on the surface to be protected by means of screw fasteners 40 as a first operation with the placement of the end pieces being the next operation. In the alternative, front end piece 22 as well as rear end piece 32 can first be engaged in the channel and locked in position by any one of the various locking methods disclosed herein. This alternative is particularly suited to the locking operation by means of a punch rivet. Where necessary, channel 18 is formed and contoured to conform to the surface contours to which it is to be attached and is thereafter secured to its mounting surface. Despite the alternatives selected, the base strip is mounted on the surface to be protected and the end pieces positioned at opposite ends of the channel prior to the time that molding strip 20 is engaged in the channel.

In the embodiment in which end pieces are provided with clips 50 having spike portions 56, the ends 76 of strip 20, are forced onto the spikes and secured thereto and then the portion 78 forming the remainder of the longitudinal extent of the molding strip 20 is press fitted into the channel until the arms 60 and 62, respectively, of the channel engage the detents 68 and 70, respectively, located along the sides of the molding strip.

Figure 5:
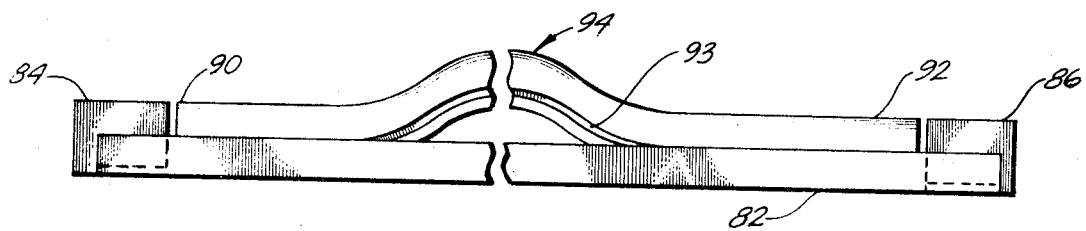
FIG. 5 is a side elevation view of a typical section of the trim strip according to the present invention illustrating the manner in which the resilient molding strip is placed in the receiving channel.

An alternate embodiment of the protective strip of the present invention and an alternate method of assembling same are illustrated with reference to FIG. 5. As shown therein, the assembly includes channel 82 with a front end piece 84 and a rear end piece 86 slid into position at the opposite ends of the channel. Instead of utilizing a slot mounted clip in the reduced portion of the respective end pieces, the end pieces are now held in position by a punch rivet. In this embodiment, as in the previous embodiment, the base strip is preferably an aluminum extrusion. When mounting the end pieces the reduced portions of the end pieces are telescopingly engaged in the ends of the channel and the assembly is turned over and placed on a hard surface. A punch such as an awl is driven sharply into the base of strip 82 riveting and locking front piece 84 in position. A similar operation is provided to rivet rear end pieces into position. A vinyl molding strip is then cut by laying a stock or extended length of molding against the length of the base channel strip with end pieces assembled. The molding is cut such that it is approximately an inch to an inch and a half longer than the assembly of channel 82, front end piece 84 and rear end piece 86. The ends 90 and 92 of the molding are then forced into the channel 82 in abutting relationship with front and rear end pieces 84 and 86, respectively, creating one or more humps 94 along the longitudinal length thereof. Once the molding strip is positioned, the humps of the molding strip are forced down into the base channel such that the side detents such as 93 on the molding strip are engaged by the arms of the base channel thereby causing the strip to be held in position in the base channel in two modes of compression. The first mode is lateral by the gripping of the arms of the channel with respect to the sides of the molding strip and the second is longitudinal by pressure as the ends 92 and 94 of the strip bear against the anchored end pieces 84 and 86, respectively.

Figure 6:
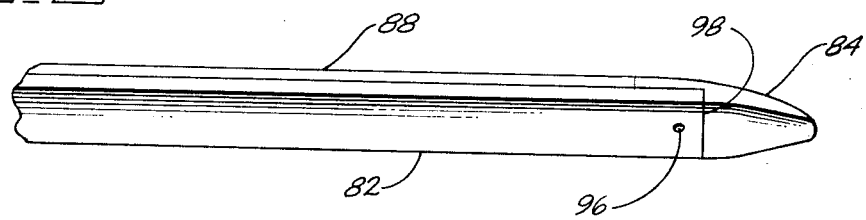
FIG. 6 is a perspective view of the punch rivet method of attachment of the end piece to the channel-shaped receiver.

The punch rivet method of affixing the end pieces to the base channel is also shown by reference to FIG. 6, a perspective view taken from the underside of an embodiment of the assembled strip according to the present invention. As illustrated, end piece 84 is mounted in channel 82 and molding strip 88 is in position. The location of the punch rivet 96 at the front end of the strip is adjacent the end 98 of channel 82 and is an inwardly directed deformation or detent caused by sharply striking a pointed instrument deforming the aluminum base of strip 82 and the base of end piece 84, thereby producing frictional engagement and anchoring of end piece 84.

Figure 7:
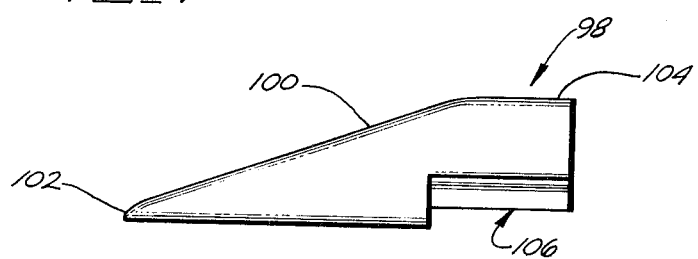
FIG. 7 is a side elevation view of a mitered end piece for the strip suitable for location at the front end of strips mounted on vehicle doors.

A mitered end piece 98 is illustrated in side elevation in FIG. 7. An end piece of this type is utilized as the front end piece on those portions of protective strips on the forward side of vehicle doors. As shown therein, end piece 98 has a mitered surface 100 which has a very gradual slope from its front edge 102 to the point of maximum elevation 104 which is disposed at generally the same height as the point of maximum elevation of the molding strip when mounted in the receivng channel to provide a flush line of transition at the point of abutment between this and the other end pieces as well. As with the end pieces previously illustrated, a key or reduced section 106 comprises the lower and inner half of the end piece 98 and is adapted to be slid into and engaged in the section of the D-shape defined by the base receiving channel.

In the preferred embodiment, the end pieces of each of the various configurations is a die casting of zinc which is thereafter polished and chromed to lend an attractive appearance. The base channel is a bright dip, anodized aluminum. Depending on the color of the vehicle finish, the vinyl molding strip is selected of a compatible color, it being found that six or seven basic colors for the vinyl are sufficient to achieve such compatibility.

What is claimed is:

1. A vehicle trim and protective strip comprising:
    an elongated receiving channel having a web portion securable to the vehicle and a pair of opposed side walls, each of said side walls being located along an opposite longitudinally extending edge of the web portion;
    a resilient molding strip secured in said channel between said side walls;
    an end piece located at each end of said channel and having a reduced portion slidably engaged in a telescoping relationship with the channel, the reduced portion having a base in facewise engagement with the web portion and having an end surface situated in an abutting relationship with an end of the molding strip; and
    means between the web portion and the base interlocking the web portion of the receiving channel and the base of the reduced portion of the end pieces for securing the end pieces to the channel.

2. A strip according to claim 1 wherein the said walls of the channel are inwardly directed providing the channel with a partially closed configuration.

3. A strip according to claim 2 wherein a longitudinal detent is provided on each side of the molding strip and is engaged by the free ends of the inwardly directed side walls of the channel.

4. A strip according to claim 3 wherein the securing means is a punch rivet.

5. A strip according to claim 3 wherein the securing means is a catch and detent arrangement in mating surfaces of the channel and end pieces.

6. A strip according to claim 5 wherein a catch is incorporated in a spring clip secured to the end piece, said clip including spike means extending into the space occupied by the resilient molding strip.

7. A strip according to claim 6 wherein the detent is an aperature through the base portion of the receiving channel whereby the end pieces are removable from the channel by compression of the spring clip.

8. A strip according to claim 7 wherein the molding strip is laterally and longitudinally compressively located in the channel between the side walls and end pieces.

9. A strip according to claim 8 wherein the base portion is secured to the vehicle by screw fasteners.

10. A strip according to claim 9 wherein the resilient molding strip has a detent in the surface thereof located in opposed relationship with respect to the screw fasteners for providing clearance for the heads of said screw fasteners.

11. A strip according to claim 10 wherein the said walls have a knife edge provided along the free edges thereof for engaging the indentations in the molding strip.

12. A strip according to claim 11 wherein the strip is comprised of at least three portions including a front fender portion, a door portion and a rear fender portion.

13. A strip according to claim 12 wherein the end piece at the leading end of the front fender portion is pointed.

14. A strip according to claim 12 wherein the end piece at the leading end of the door portion is mitered.

15. A strip according to claim 12 wherein the end piece at the trailing end of each of said three portions has a flat surface at its trailing edge.

16. A protective bumper strip comprising:
an elongated molding of a resilient material having a pair of indentations each extending longitudinally of the strip on an opposite side thereof;
an elongated, channel-shaped, rigid, extruded receiver for the molding, the receiver comprising a web portion having at least one aperture for a through-the-web fastening of the receiver to a surface to be protected and a pair of curved flanges extending from said web upwardly and inwardly toward each other to define a longitudinally extending slot for the molding, the free edges of the flanges being engaged in the indentations;
a detent located in the interior surface of said receiver adjacent each end thereof;
a substantially solid, cast end piece slidably engaged in each end of the receiver; and
catch means located in the surface of each end piece engaged with said receiver detents whereby said end pieces are secured in position in said receiver in an abutting relationship with said molding.

17. A bumper strip according to claim 16 wherein the molding is a vinyl material, the receiver is an aluminum extrusion and the end pieces are chromed zinc castings.

18. A strip according to claim 17 wherein the detents are aperatures extending through the web portion of the receiver and the catch means are located in the bottom surface of the end pieces in mating location with respect to the apertures.

19. A strip according to claim 18 wherein the end pieces have a reduced portion in the end adjacent the molding with an outline conforming to the interior of the channel, the remainder of the end pieces having an outline mating with the outline of the assembled molding and channel-shaped receiver.

20. A strip according to claim 19 wherein the molding is cut longer than the length of the assembled receiver and end pieces such that when placed in the receiver the molding is retained therein under lateral and longitudinal compressive loading.

21. A strip according to claim 18 including spike means secured to the end pieces with the molding being engaged with said spikes so as to abut the interior surfaces of the end pieces.

22. Apparatus for protecting the finish of a vehicle, which comprises:
a resilient molding strip;
an elongated channel for receiving the strip, which includes a pair of opposed side walls for laterally supporting the strip in the channel and a web portion which joins the side walls and which is securable to the vehicle;
means for stressing the strip to secure it in the channel, which includes a pair of end pieces each having a shoulder, a reduced portion which extends from the shoulder and has base and end surfaces, each reduced portion being shaped to slide into the channel to bring its shoulder into abutment with a respective one of opposite, laterally extending edges of the web portion and to bring its end surface into abutment with the corresponding end of the strip; and
securing means between the web portion and the base for interlocking the web portion in facewise engagement with the base surface of the reduced portion of each end piece.

23. Apparatus according to claim 22 wherein the strip has a pair of indentations each extending longitudinally of the strip on an opposite side thereof and each of the side walls has an inwardly turned knife edge for engaging a corresponding indentation.

24. Apparatus according to claim 22 wherein the channel is a rigid extrusion and each end piece is substantially solid.

25. Apparatus according to claim 22 wherein the securing means is a punch rivet.

26. Apparatus according to claim 22 wherein the securing means is a catch and detent arrangement in mating surfaces of the channel and end pieces.

27. Apparatus according to claim 22 wherein the molding strip, when unstressed, is longer than the channel.

28. Apparatus according to claim 22 wherein the molding strip, when unstressed, is shorter than the channel.

* * * * *